US010977303B2

(12) United States Patent
Wu et al.

(10) Patent No.: US 10,977,303 B2
(45) Date of Patent: Apr. 13, 2021

(54) IMAGE RETRIEVAL USING INTERACTIVE NATURAL LANGUAGE DIALOG

(71) Applicant: International Business Machines Corporation, Armonk, NY (US)

(72) Inventors: Hui Wu, White Plains, NY (US); Rogerio S. Feris, Hartford, CT (US); Yu Cheng, Ossining, NY (US); Xiaoxiao Guo, Mountain View, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 354 days.

(21) Appl. No.: 15/927,309

(22) Filed: Mar. 21, 2018

(65) Prior Publication Data

US 2019/0294702 A1 Sep. 26, 2019

(51) Int. Cl.
| | | |
|---|---|---|
| G06F 7/02 | (2006.01) |
| G06F 16/00 | (2019.01) |
| G06F 16/583 | (2019.01) |
| G06F 16/242 | (2019.01) |
| G06F 16/951 | (2019.01) |
| G06F 40/253 | (2020.01) |

(52) U.S. Cl.
CPC ........ *G06F 16/5838* (2019.01); *G06F 16/243* (2019.01); *G06F 16/951* (2019.01); *G06F 40/253* (2020.01)

(58) Field of Classification Search
CPC .... G06F 16/951; G06F 16/5838; G06F 16/58; G06F 16/243; G06F 16/3329; G06F 16/53; G06F 40/20; G06F 40/30; G06F 40/253; G06F 40/35; G06F 7/023; G06F 40/16; G06N 20/00; G06N 3/0445
See application file for complete search history.

(56) References Cited

U.S. PATENT DOCUMENTS

| | | | | |
|---|---|---|---|---|
| 8,190,604 B2 * | 5/2012 | Wen | ...................... | G06F 16/583 |
| | | | | 707/732 |
| 10,140,421 B1 * | 11/2018 | Bernard | ................ | A61B 5/0022 |
| 10,210,178 B2 * | 2/2019 | Souche | ................ | G06N 3/0454 |
| 2017/0278135 A1 | 9/2017 | Majumdar et al. | | |
| 2018/0012110 A1 * | 1/2018 | Souche | ................... | G06F 16/50 |

(Continued)

FOREIGN PATENT DOCUMENTS

WO 2017096099 A1 6/2017

*Primary Examiner* — Bruce M Moser
(74) *Attorney, Agent, or Firm* — Garg Law Firm, PLLC; Rakesh Garg; Anthony Curro (57) ABSTRACT

A search engine is modified to perform increasingly precise image searching using iterative Natural Language (NL) interactions. From an NL search input, the modification extracts a set of input features, which includes a set of response features corresponding to an NL statement in the NL search input and a set of image features from a seed image in the NL search input. The modification performs image analysis on an image result in a result set of a query including at least some of the input features. In a next iteration of NL interactions, at least some of the result set is provided. An NL response in the iteration is added to a cumulative NL basis, and a revised result set is provided, which includes a new image result corresponding to a new response feature extracted from the cumulative NL basis.

20 Claims, 7 Drawing Sheets

(56) References Cited

U.S. PATENT DOCUMENTS

2018/0060029 A1    3/2018  Kogan et al.
2018/0108066 A1*  4/2018  Kale ................. G06F 16/24522
2018/0157681 A1*  6/2018  Yang ................ H03M 13/1575
2018/0314689 A1* 11/2018  Wang ...................... G10L 15/22
2019/0163768 A1*  5/2019  Gulati ................ G06F 16/9535

* cited by examiner

IMAGE RETRIEVAL USING INTERACTIVE NATURAL LANGUAGE DIALOG

TECHNICAL FIELD

The present invention relates generally to a method, system, and computer program product for searching and retrieving images. More particularly, the present invention relates to a method, system, and computer program product for image retrieval using interactive natural language dialog.

BACKGROUND

Hereinafter, a digital image is interchangeably referred to as simply "images" or "image" unless expressly disambiguated where used. An image can be a single-frame static image, an animated image, a frame in a video, photographic image, caricature, and with or without text.

An image is a digital representation or facsimile of a physical object or a collection of physical objects. Technology presently exists to detect or recognize certain objects that are present in a given image. For example, a digital camera can recognize that objects, such as human faces or human eyes, are present in an image created by the camera lens on the sensor of the camera. Photo editing software can recognize that objects, such as straight lines, are present in an image being edited.

A search engine is understood to be an application that executes on a computer and is configured to search for information that is available in electronic form. Many search engines are presently available for searching local or remote repositories of information, including but not limited to searching using the internet. A search engine is capable of searching for textual content as well as images.

A natural language (NL) is a scripted (written) or a vocalized (spoken) language having a form that is employed by humans for primarily communicating with other humans or with systems having a natural language interface.

Natural language processing (NLP) is a technique that facilitates exchange of information between humans and data processing systems. For example, one branch of NLP pertains to transforming human readable or human understandable content into machine usable data. For example, NLP engines are presently usable to accept input content such as a newspaper article or human speech, and produce structured data, such as an outline of the input content, most significant and least significant parts, a subject, a reference, dependencies within the content, and the like, from the given content.

Another branch of NLP pertains to answering questions about a subject matter based on information available about the subject matter domain. This is the branch of cognitive analytics. A cognitive system is a data processing system that perform cognitive analysis, and such a system is also referred to as a Question and Answer system (Q and A system). Cognitive analytics is the process of analyzing available information or knowledge to create, infer, deduce, or derive new information. A cognitive system can perform such an analysis based on natural language inputs.

SUMMARY

The illustrative embodiments provide a method, system, and computer program product. An embodiment includes a method that modifies a search engine to perform increasingly precise image searching using iterative Natural Language (NL) interactions. The modifications by the embodiment include, extracting, from an NL search input, a set of input features, the set of input features comprising a set of response features corresponding to an NL statement in the NL search input and a set of image features from a seed image in the NL search input; performing image analysis on an image result in a result set, the result set being responsive to a query comprising a subset of the input features; providing at least a subset of the result set as a part of an NL interaction in a next iteration of NL interactions; adding, to the NL search input, an NL response obtained in the next iteration to form a cumulative NL basis for the image searching; and providing a revised result set responsive to the next iteration of NL interactions, wherein the revised result set includes a new image result, and wherein the new image result corresponds to a new response feature extracted from the cumulative NL basis.

An embodiment includes a computer usable program product. The computer usable program product includes a computer-readable storage device, and program instructions stored on the storage device.

An embodiment includes a computer system. The computer system includes a processor, a computer-readable memory, and a computer-readable storage device, and program instructions stored on the storage device for execution by the processor via the memory.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Search engines and online searching is a well-recognized technological field of endeavor. The present state of the technology in this field of endeavor has certain drawbacks and limitations. The operations of the illustrative embodiments impart additional or new capabilities to improve the existing technology in the technological field of endeavor of search engines and online searching, especially in the area of searching for images.

The illustrative embodiments recognize that presently, a user has to provide a precisely specified search query to a search engine, in order for the search engine to find images responsive to the query. The illustrative embodiments recognize that presently available search engines return a result set including one or more images, which may or may not be relevant to the search objective of the user.

The illustrative embodiments recognize that often, a search begins with an unclear or general idea of what the user might be searching for, and only upon seeing the result set does the user's search objective become clearer. An objective of the search is a desired result from the search. Presently available search engines allow a user to either submit a new search query for a new search, or refine the result set by searching within the result set.

The illustrative embodiments recognize that neither of these two methods of searching is effective in many cases. For example, in many cases, the user can express in a conversational style an objective of the search, but finds it difficult to put the objective in the form of a search query. In many other cases, the user only has a general idea about what the user is searching for, and needs assistance in ascertaining the objective. Such a situation is all too familiar in a brick and mortar store where a sales assistant begins by asking a shopper a series of questions about the user's choices, preferences, history of purchases, history of experiences, needs to be met, purpose for which an object will be used, etc. Based on the answers the shopper provides, the sales assistant adjusts the subsequent questions in an effort to determine an object behind the shopping exercise of the user.

The illustrative embodiments recognize that as much of shopping has shifted from brick and mortar stores to online stores, such a mechanism remains unavailable in the presently used online searching technologies that are integral to online shopping. Presently, the user is only provided a result set that corresponds to the search query the user specifies, and in some cases, perhaps a suggested result set as well. However, the presently available search technology provides no method of interactive communication with the user in a human-like natural language conversation, which might assist the user in a manner of a sales assistant in a brick and mortar store.

The illustrative embodiments further recognize that generally, such an interactive methodology is useful in enhancing the relevance of the search results in any result set corresponding to search for any type of information, including but not limited to search for digital information about products and services in online shopping. For example, a drafter drafting a computer-aided drawing might need stock images or image components to include in the drawing, but might need interactive help in a similar manner to find the image or images that are most relevant to the use or purpose the drafter has in mind.

The present state of the technological field of endeavor of search engines and information searching presently does not include a mechanism to interactively and iteratively guide a user towards an increasing precision of the user's search objective. Existing interactive image retrieval methods can only progressively refine the results based on a very restrictive form of user's feedback. For example, a user of an existing interactive image retrieval system can click on some "good" results and "bad" results and the system adjusts the ranking of all image results based on this feedback and returns a re-ranked list of top ranked image results. Such a presently available method does not allow the user to say precisely what visual details make some images "good/bad". A need exists for an improved search mechanism that can interact with a user in a human-like natural language conversation, to progressively refine not only an already produced result set but with new result sets. The iterative interactive method of an embodiment allows the user to be as specific, vague, colloquial, verbose, or conversational in describing the details of what good or bad characteristics are desired or not desired by the user.

The illustrative embodiments recognize that the presently available tools or solutions do not address these needs/problems or provide adequate solutions for these needs/problems. The illustrative embodiments used to describe the invention generally address and solve the above-described problems and other related problems by image retrieval using interactive natural language dialog.

An embodiment can be implemented as a combination of certain hardware components and a software application. An implementation of an embodiment, or one or more components thereof, can be configured as a modification of an existing search engine, with a companion software application executing in some combination of (i) the search engine itself, (ii) a data processing system communicating with the search engine over short-range radio or a local area network (LAN), and (iii) a data processing system communicating with the search engine over a wide area network (WAN).

An embodiment receives an initial request for a search from a user. The request can take the form of a search query, an audio or textual natural language statement, an image, or some combination thereof. The image presented in an initial search request is hereinafter referred to as a "seed image." For example, the user might speak or textually input the NL sentence "how about some handbags like this?" and also input a seed image that includes a handbag.

The embodiment analyzes the seed image to extract a set of image features. An image feature is a describable property of an object in the image that is also referenced in the accompanying NL or keyword input. For example, if the NL statement refers to a handbag and the seed image includes a plurality of people in some setting in which one is holding a handbag, an image feature may be a shape, size, color, pattern, brand, or material of the handbag regardless of what else is represented in the seed image.

If the search request includes a search query, the embodiment passes the query and at least a subset of image features to a search engine. The search engine prepares a result set using data from one or more repositories.

If the search request includes an NL statement, the embodiment parses the statement, e.g., using a cognitive system configured to extract a set of response features from a user's NL statements. A response feature is a part of speech in a NL sentence according to a grammatical construct of the NL and references a subject of the NL sentence. For example, in the NL statement "how about some handbags like this?" the subject is "handbags". Accordingly, one response feature is "handbags" and synonyms of "handbags." Additional response features may be based on the phrase "like this," which leads to the creation of response features that indicate a referential similarity to something that is also provided in the input, to wit, the image features.

A simple example of an NL input and a simple example of a seed image are selected for the clarity of the description and not to imply any limitation to such simple forms of input. From this disclosure, those of ordinary skill in the art will be able to conceive many other complex NL statements comprising multiple response features, other types of seed images comprising other variations of image features, or both, and the same are contemplated within the scope of the illustrative embodiments.

One embodiment constructs a query using at least a subset of the response feature and at least a subset of image features. The embodiment passes the constructed query to a search engine. Another embodiment passes a subset of response features and a subset of the image features to the search engine.

A user input can also be only an annotated seed image, where the annotation marks an object of interest in the seed image. The annotation can take any suitable form. If the image is of a singular object, no annotation may be necessary, and the embodiment extracts the set of image features for the depicted singular object. In such a case, one embodiment constructs a search query using only the set or a subset of the image features related to the object of interest.

The result set includes images as results. Once the result set has been produced by the search engine, an embodiment analyzes an image result to extract a set of the image feature relevant to the subject of the user input. The embodiment matches the set of image features with the set of response features to determine a degree of correspondence between the image result and the user input. The match between an image feature and a response feature can be within a specified tolerance, and can be performed using any suitable matching algorithm. Based on the degree of match between an image result and the user input, an embodiment computes a confidence value corresponding to the image result. The confidence value represents the degree of match, and is usable to determine a degree to which the image result corresponds to the user input. The higher the confidence, the higher the correspondence, and vice-versa.

A result set may include image results that achieve different degrees of confidence relative to one another. One embodiment ranks and re-arranges the image results in the result set according to their respective confidence.

An embodiment presents the result set to the user and initiates an NL conversation with the user. The embodiment may ask a question in NL, e.g., "which of these do you like?" or may make suggestive NL statements, e.g., "I think you will like these." The NL conversation mimics the human sales attendant's approach described earlier, and is configured to gradually and interactively guide the user to a well-defined and precise search objective.

Based on the user's NL response, the embodiment triggers another iteration of searching. Specifically, the embodiment collects the user input and each NL response of the user as a cumulative NL basis for the search. The embodiment analyzes the cumulative NL basis to extract a new set of response features. If the user indicates a preference for one or more image responses from the presented result set, the embodiment also extracts a set of image features from each such image result.

The embodiment then constructs a new search query using at least a subset of the response features from the cumulative NL input and at least a subset of the image features extracted from the seed image and any preferred image result. The embodiment passes the query to a search engine. The search engine prepares a new result set using data from one or more repositories. One embodiment may cause the search engine to use the new query to narrow a previous result set instead of constructing a new result set.

Any number of iterations of such embodiment-initiated NL conversation and NL response from the user may be used to progressively improve the relevance of the result set to the user's search objective.

An embodiment determines whether an exit condition is satisfied by the result set. One non-limiting example of an exit condition may be that at least a threshold fraction of the result set has a confidence value greater than a threshold confidence value. Another example of an exit condition may be a user input that indicates that the user is satisfied with the last result set or has otherwise chosen to exit the process.

A training process trains the combination of (i) an application implementing an embodiment and (ii) a cognitive system. The training allows the combination to improve feature extraction from user inputs and response in an NL, improve feature extraction from seed image and image results, or both.

One example training process uses an initial training input, a ground truth image, and one or more NL interactions to train the combination. For example, the initial input provides an NL statement and a seed image to the combination. Sets of input features and image features are extracted by the combination as described herein. The image results are compared to the cumulative NL basis and their confidence values are evaluated relative to the features of the ground truth, as described herein. Based on the confidence value of one or more image results, a feature extraction adjustment is applied to the application, the cognitive system, or both, in the combination. The adjustment is configured to improve the confidence value of the same or similar image result in a subsequent training iteration.

The training may employ several training iterations in this manner. The number of iterations is implementation-specific. For example, in one case, the training may be accomplished using hundreds of thousands of iterations, and in another case, by only tens or hundreds of iterations. The training concludes when an image result has a confidence value above the threshold confidence value relative to the ground truth, or an exit condition is satisfied. The training produces a trained combination of an embodiment and cognitive system. The trained combination can then be used in a production environment with actual user inputs and seed images.

The manner of image retrieval using interactive natural language dialog described herein is unavailable in the presently available methods in the technological field of endeavor pertaining to search engines and particularly to searching images. A method of an embodiment described herein, when implemented to execute on a device or data processing system, comprises substantial advancement of the functionality of that device or data processing system in assisting a user via iterative human-like NL interactions, to gradually define with increasing precision the characteristics of images sought from a search engine.

The illustrative embodiments are described with respect to certain types of objects, images, image features, inputs, NL inputs, NL responses and interactions, response features, comparisons, confidence, thresholds, tolerances, training, conditions, cognitive configurations, locations of embodiments, additional data, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 1:
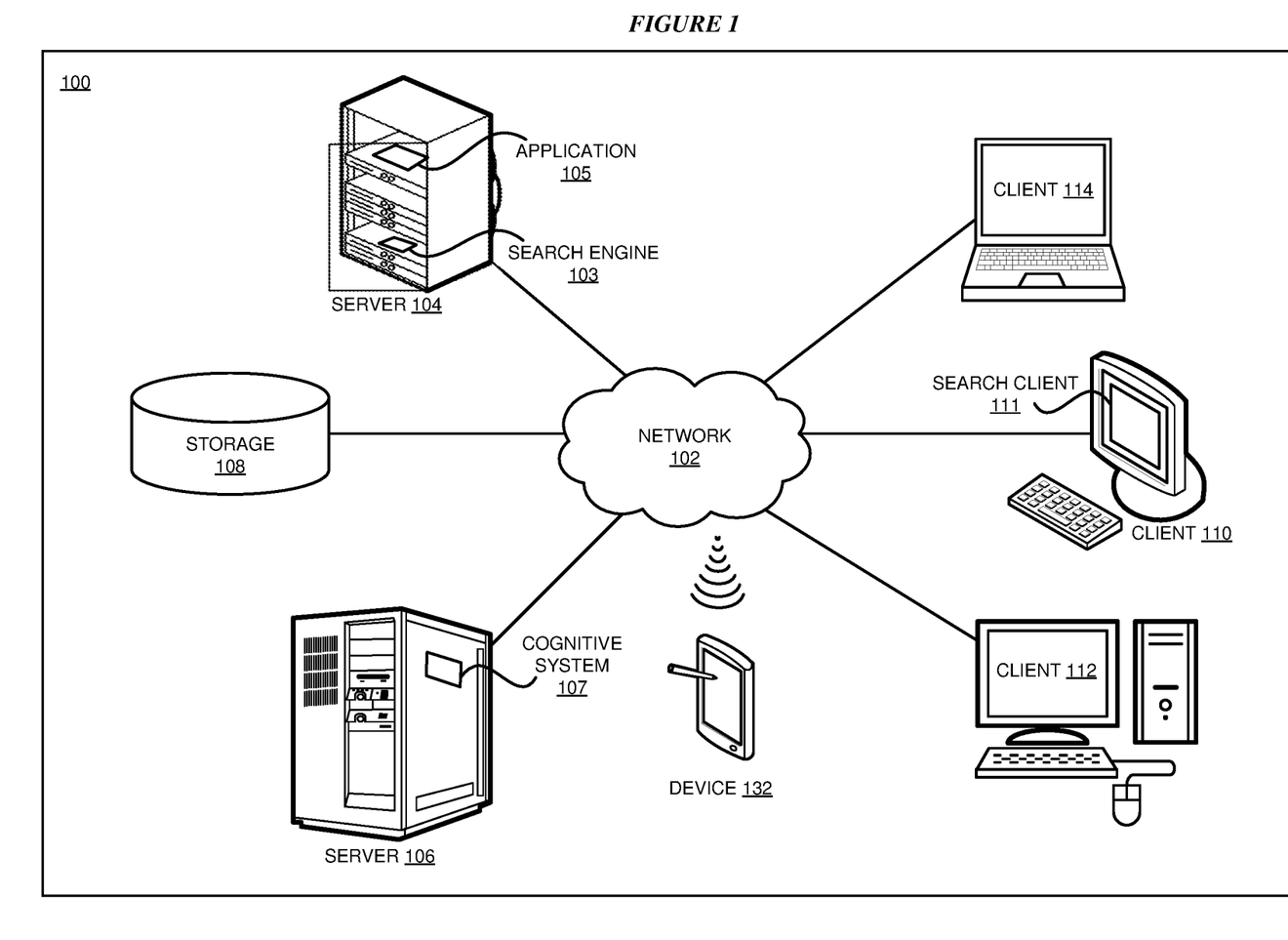
FIG. 1 depicts a block diagram of a network of data processing systems in which illustrative embodiments may be implemented.
Figure 2:
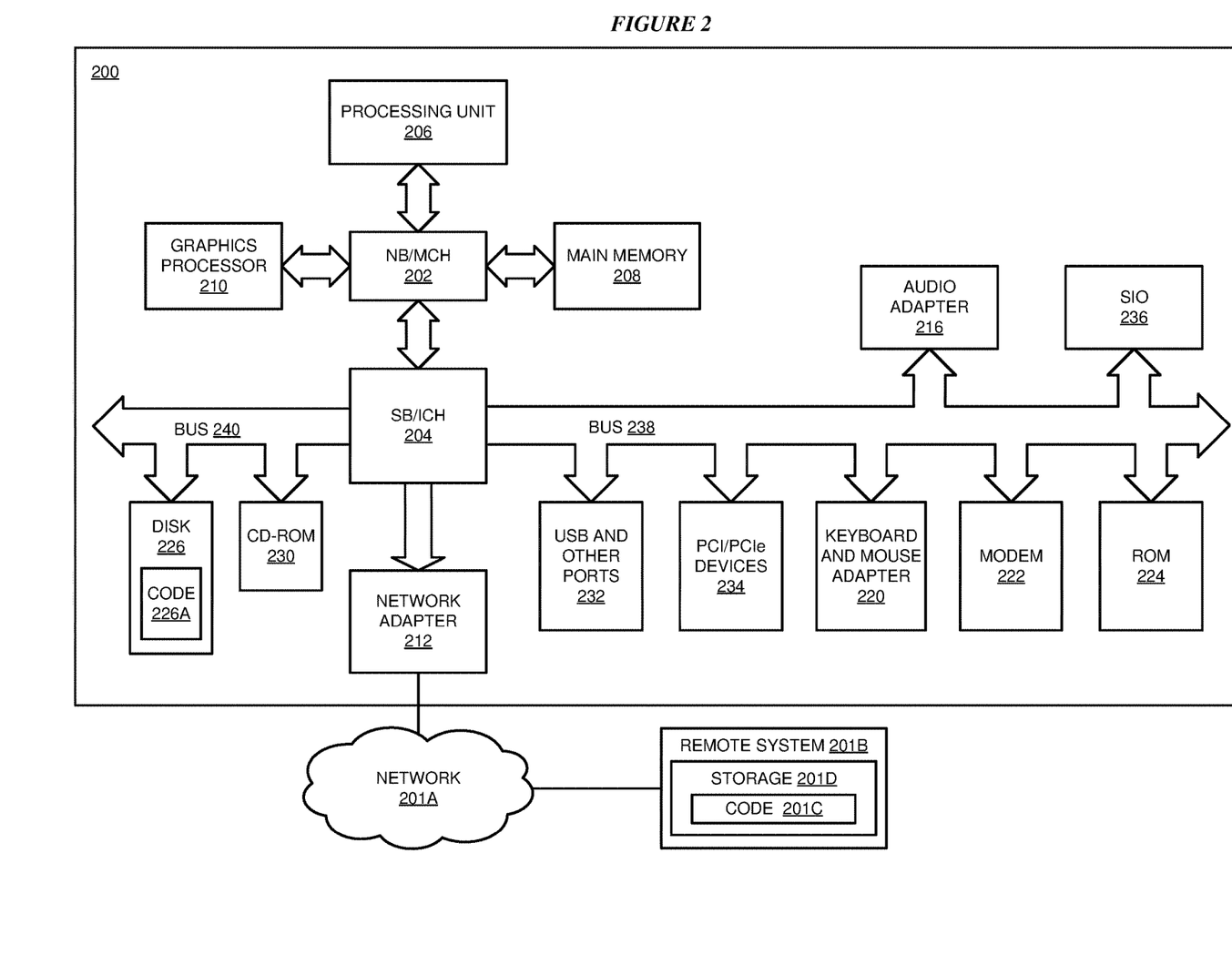
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as examples and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein and improves the operations of search engine 103 in a manner described herein. For an operation described herein application 105 uses cognitive system 107. The combination of application 105 and cognitive system 107 is trained in a manner described herein. Search client 111 is a client application the is usable to submit user inputs, seed image, and user's NL responses to application 105, and to conduct NL interactions with application 105.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
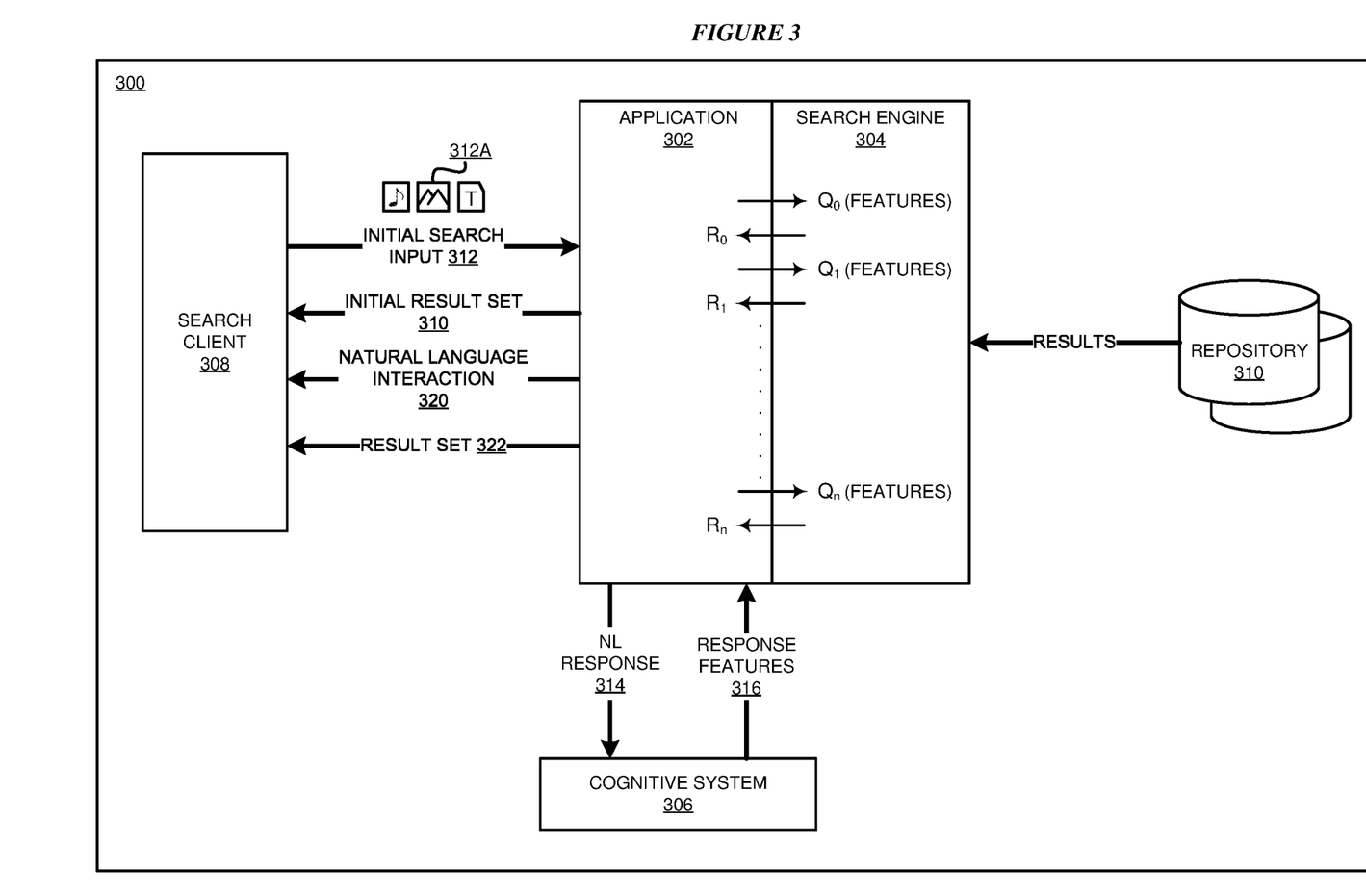
FIG. 3 depicts a block diagram of an example configuration for image retrieval using interactive natural language dialog in accordance with an illustrative embodiment.

With reference to FIG. 3, this figure depicts a block diagram of an example configuration for image retrieval using interactive natural language dialog in accordance with an illustrative embodiment. Application 302 is an example of application 105 in FIG. 1. Search engine 304 is an example of search engine 103 in FIG. 1. Cognitive system 306 is an example of cognitive system 107 in FIG. 1. Search client 308 is an example of search client 111 in FIG. 1. Repository 310 may be one or more image storage systems and/or a network of computing resources which might provide image data to search engine 304.

A user uses client application 308 to provide initial search input 312 to application 302. Initial search input 312 includes optional seed image 312A, and optionally textual or audible NL statement, search query, or annotations, as described herein. This manner of initiating the search is not intended to be limiting on the illustrative embodiments. A search can be initiated in many other ways. For example, another possible way to start the search may be that the user does not provide any information, the system kick-starts the interaction by providing a random set of images in the initial iteration and seek user feedback as the next iteration. In another example way of initiating a search, the user may specify only a natural language statement, e.g., "yellow strappy handbags,") and the statement alone is used in the initial iteration to find a first result set as described herein. From this disclosure, those of ordinary skill in the art will be able to conceive many other ways of starting the search, and the same are contemplated within the scope of the illustrative embodiments.

Application 302 uses cognitive system 306 to extract response features from initial search input 312. For example, application 302 sends initial search input 312 as NL response 314 to cognitive system 306 and cognitive system 306 returns a set of response features 316 to application 302. In one embodiment, cognitive system 306 uses initial search input 312 in conjunction with a historical record of past interactive NL dialog with the user. The historical record and input 312 together initiate the cumulative NL basis, as described herein. The historical record of NL dialog with one or more users can be maintained in any manner suitable for the given implementation, including, but not limited to within a repository of cognitive system, 306.

Application 302 uses a built-in image processing function (not shown), or an external image processing tool (not shown), to extract a set of image features from seed image 312A.

Application 302 constructs query Q0 from initial search input 312 and sends Q0 to search engine 304. Query Q0 includes some or all response features extracted from initial search input 312, some or all of the keywords supplied by the user in initial search input 312 if any, some or all image features extracted from seed image 312A, or some combination thereof.

In response to Q0, search engine 304 retrieves a result set comprising image results from repository 310. Search engine 304 returns the result set as result set R0 to application 302.

Application 302 performs a relevance determination of the image results in R0 based on the feature matching and confidence computation as described herein. Application 302 optionally reorders the image results in result set R0. Application 302 returns initial result set 310 which may include only a subset of those image results of R0 which have a confidence value greater than a threshold confidence value. Initial result set 310 may also include image results in a different order as compared to the order in R0.

Application 302 performs NL interaction 320 with the user via client 308. Specifically, an iteration of NL interaction 320 includes a NL statement constructed and presented by application 302 referencing a previously presented result set, e.g., referencing initial result set 314 in the first iteration of NL interaction 320. NL interaction 320 also includes an NL response provided by the user via client 308 to application 302.

Application 302 adds the NL response to a cumulative NL basis. Cumulative NL basis now includes initial search input 312 and all NL responses from previous iterations of NL interaction 320. According to one embodiment, application 302 the cumulative NL basis to cognitive system 306 as NL response 314. Application 302 receives a revised set of response features 316 from cognitive system 306.

Application 302 constructs revised query Q1 using the most recent set of response features 316 and a revised set of image features. A revised set of image features may be available if application 302 analyzes any additional image inputs provided by the user, an image result identified by the user, or some combination thereof.

Application 302 provides subsequent revised query Q1 to search engine 304. Search engine 304 returns revised result set R1 in response to Q1. Application 302 engages in another iteration of NL interaction 320, if needed according to the specific circumstance, and repeats the process described with respect to Q1 and R1. Thus, any number of iterations can transpire resulting in revised queries Q1 . . . Qn and corresponding R1 . . . Rn. The result set of an iteration in which an exit condition is satisfied forms final result set 322 that application 302 sends to client 308. Application 302 ends NL interaction 320 thereafter.

Figure 4:
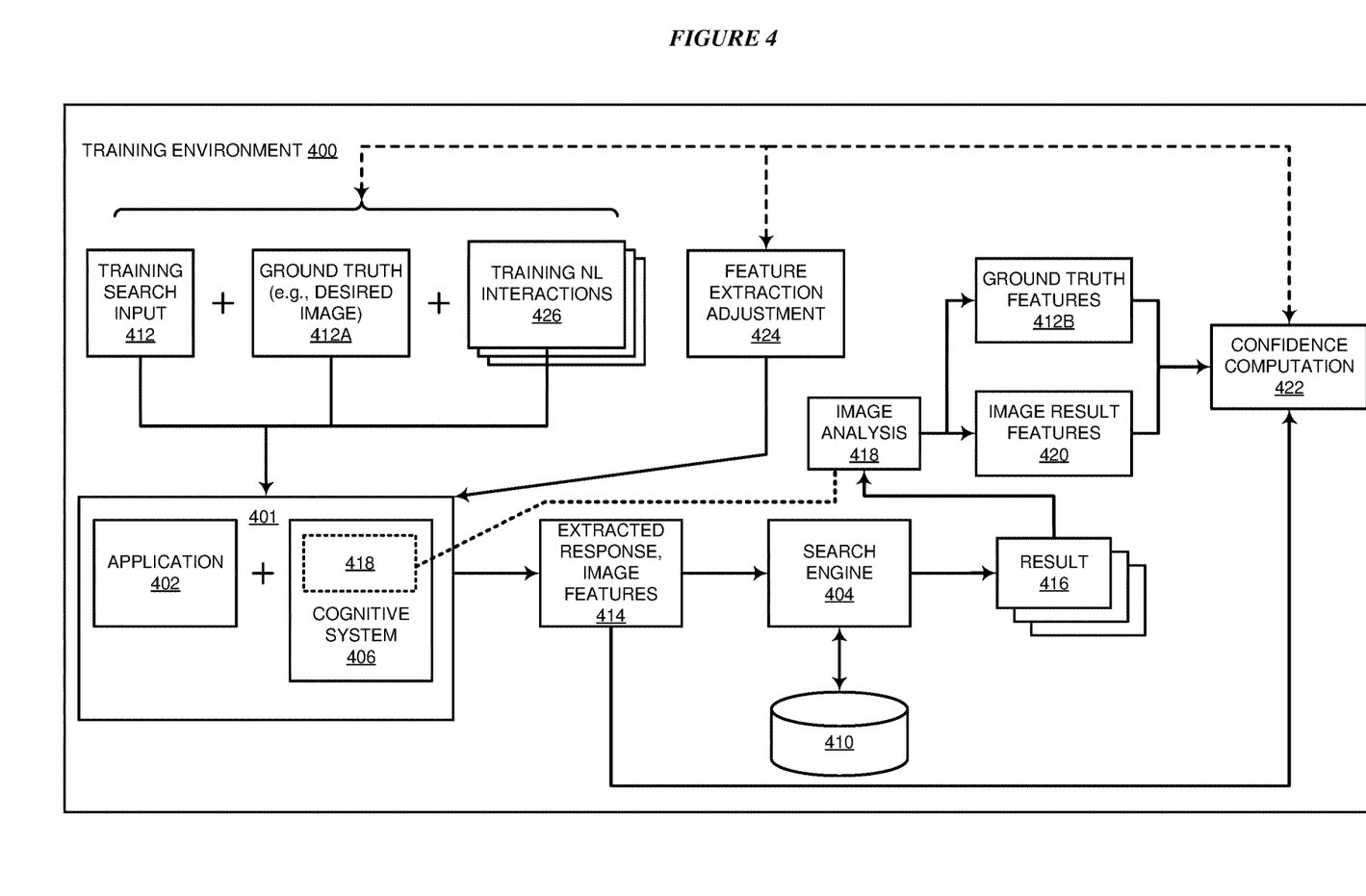
FIG. 4 depicts a block diagram of an example training process for image retrieval using interactive natural language dialog in accordance with an illustrative embodiment.

With reference to FIG. 4, this figure depicts a block diagram of an example training process for image retrieval using interactive natural language dialog in accordance with an illustrative embodiment. Training environment 400 trains combination 401, which includes application 402 and cognitive system 406. Application 402 is an example of application 302 in FIG. 3. Cognitive system 406 is an example of cognitive system 306 in FIG. 3. Search engine 404 is an example of search engine 304 in FIG. 3. Repository 410 is an example of repository 310 in FIG. 3.

Training search input 412 simulates a search input expected from a user in a production environment for image searching. Ground truth 412A is an image of a desired result, which the search should find such that the result is either ground truth 412A exactly or an approximation thereof within a specified tolerance. Ground truth 412A can be regarded as a seed image, as described with respect to FIG. 3.

Given input 412 and ground truth 412A, combination 401 extracts set 414 of features. Set 414 may include a set of image features, a set of response features, or a combination thereof, depending upon input 412 and ground truth 412A. For example, image analysis component 418 may be a component of, or a component used by, cognitive system 406 in combination 401; and combination 401 uses image analysis component 418 to produce set 412B of image features.

A query formulated from set 414 is sent to search engine 404. Search engine 404 uses repository 410 to extract a result set. The result set includes one or more image result 416.

Image analysis component 418 analyzes an image result 416 to produce set 420 of image features of image result 416. Confidence computation component 422 uses (i) set 414 of features—which includes a set of response features and may also include set 412B of image features, and (ii) set 420 of image result features to determine a match and a degree of the match between image result 416 and the combination of search input 412 and ground truth 412A. Component 422 computes a confidence value corresponding to image result 416 as described earlier. Component 424 receives the confidence value output of component 422 and determines an adjustment that should be applied to combination 401 to cause a change in a feature extraction process. The change in the feature extraction process should be such that for the same input 412 and the same ground truth 412A, a revised set of features extracted after the adjustment would find a different image result 416 such that the different image result 416 will result in an improved (higher) confidence value.

The output of component 422 also triggers an NL interaction from training NL interaction 426. In the next iteration of the training, combination 401 uses the cumulative NL basis formed by input 412, ground truth 412A, and training NL interaction 426 to obtain a revised result set as described earlier.

The training concludes when the result set includes an image result 416 that is either an exact match with ground truth 412A or an acceptable approximation thereof within the specified tolerance. Trained combination 402 resulting from the adjustments by component 424 and training NL interactions 426 can then be deployed in a production environment to perform an interactive NL image search for users.

Figure 5A:
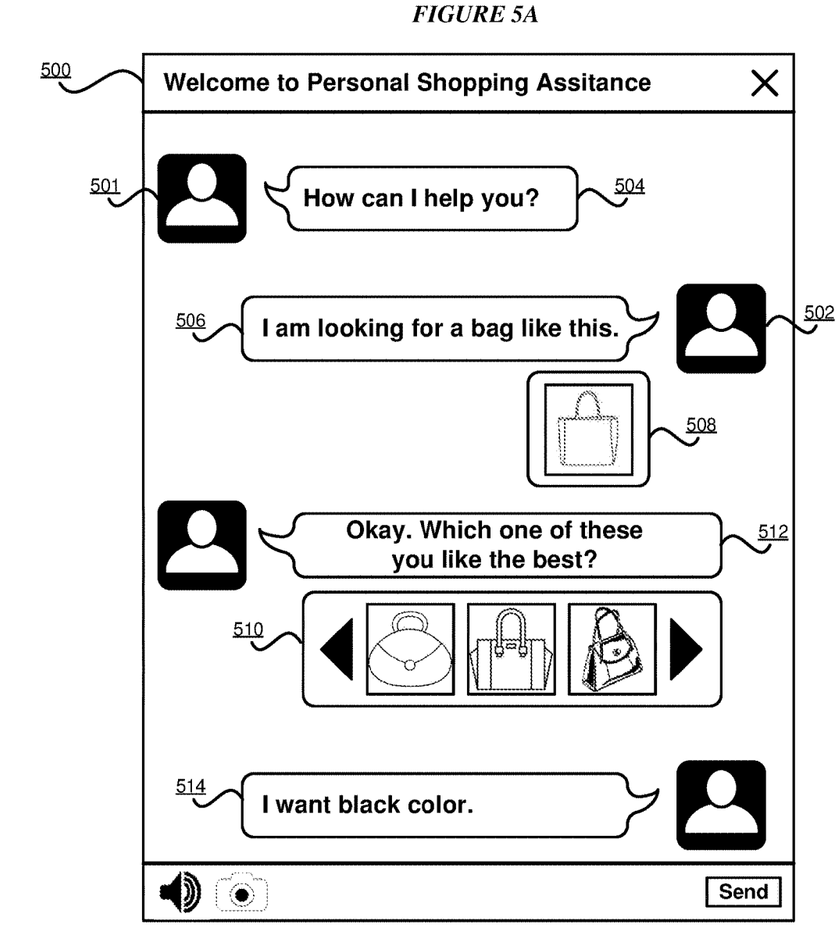
FIG. 5A depicts an example interactive NL image search in accordance with an illustrative embodiment.

With reference to FIG. 5A, this figure depicts an example interactive NL image search in accordance with an illustrative embodiment. Search client 500 is an example of search client 308 in FIG. 3. Interactive shopping agent 501 is an example of trained combination 401 resulting from FIG. 4. User 502 is a human user.

In the depicted example, the interactive image search is initiated as an NL interaction by agent 501, e.g., by asking NL question 504. User 502 responds with NL search input 506 and seed image 508.

Agent 502 presents result set 510 along with NL interaction 512. Result set 510 includes one or more image results that are optionally rearranged or ranked in an order as described earlier. NL interaction 512 seeks to elicit a choice response from user 502, which agent 501 will use in the next iteration of image search in a manner described herein. User 502 provides NL response 514, from which agent 501 can extract additional response features.

Figure 5B:
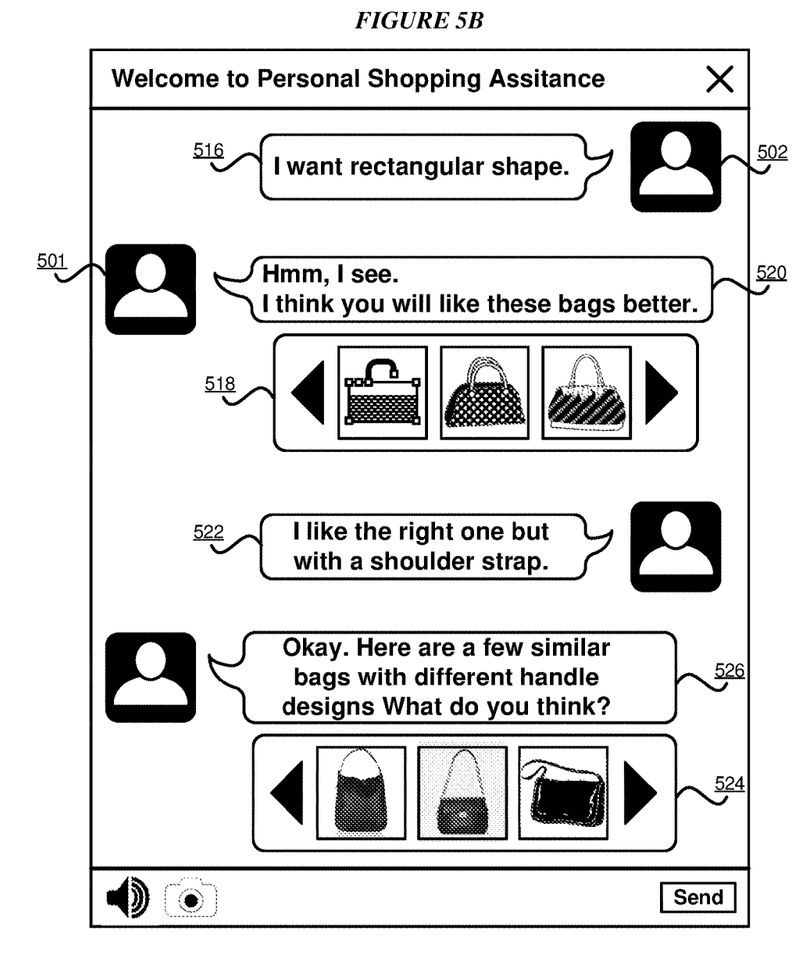
FIG. 5B depicts a continuation of the example interactive NL image search from FIG. 5A.

With reference to FIG. 5B, this figure depicts a continuation of the example interactive NL image search from FIG. 5A. User 502 can provide more than one NL responses. As shown in FIG. 5B, user 502 provides NL response 516 in addition to NL response 514. Agent 501 processes NL responses 514 and 516 cumulatively with input 506 and seed image 508 to produce revised result set 518. The image results in result set 518 are now closer to user 502's search objective as compared to the image results in result set 510.

Agent 501 initiates another NL interaction with user 502 by outputting NL statement 520 in conjunction with result set 518. User 502 provides NL response 522, which agent 501 adds to cumulative NL basis for the interactive NL image search. Agent 501 uses the cumulative NL basis for producing revised result set 524. Agent 501 also outputs another NL interaction 526 in conjunction with result set 524. The image results in result set 524 are even closer to user 502's search objective as compared to the image results in result set 518 because the iterative NL interaction is assisting user 502 in clarifying the user's search objective in a human-like manner, as different from the presently available search methods.

The iterative NL interactions can continue in the manner of FIGS. 5A-5B for any number of iterations. According to one embodiment, the iterations end when user 502 indicates that an image result in a result set satisfies the user's search objective, or the user has determined to end the search for some other reason. In another embodiment, agent 501 can terminate the iterative NL interactions when agent 501 determines that an exit condition has been satisfied, e.g., when user 502 as selected an image result from a result set and proceeded to perform a next action relative to the selected image result, such as engage in a buying transaction.

Figure 6:
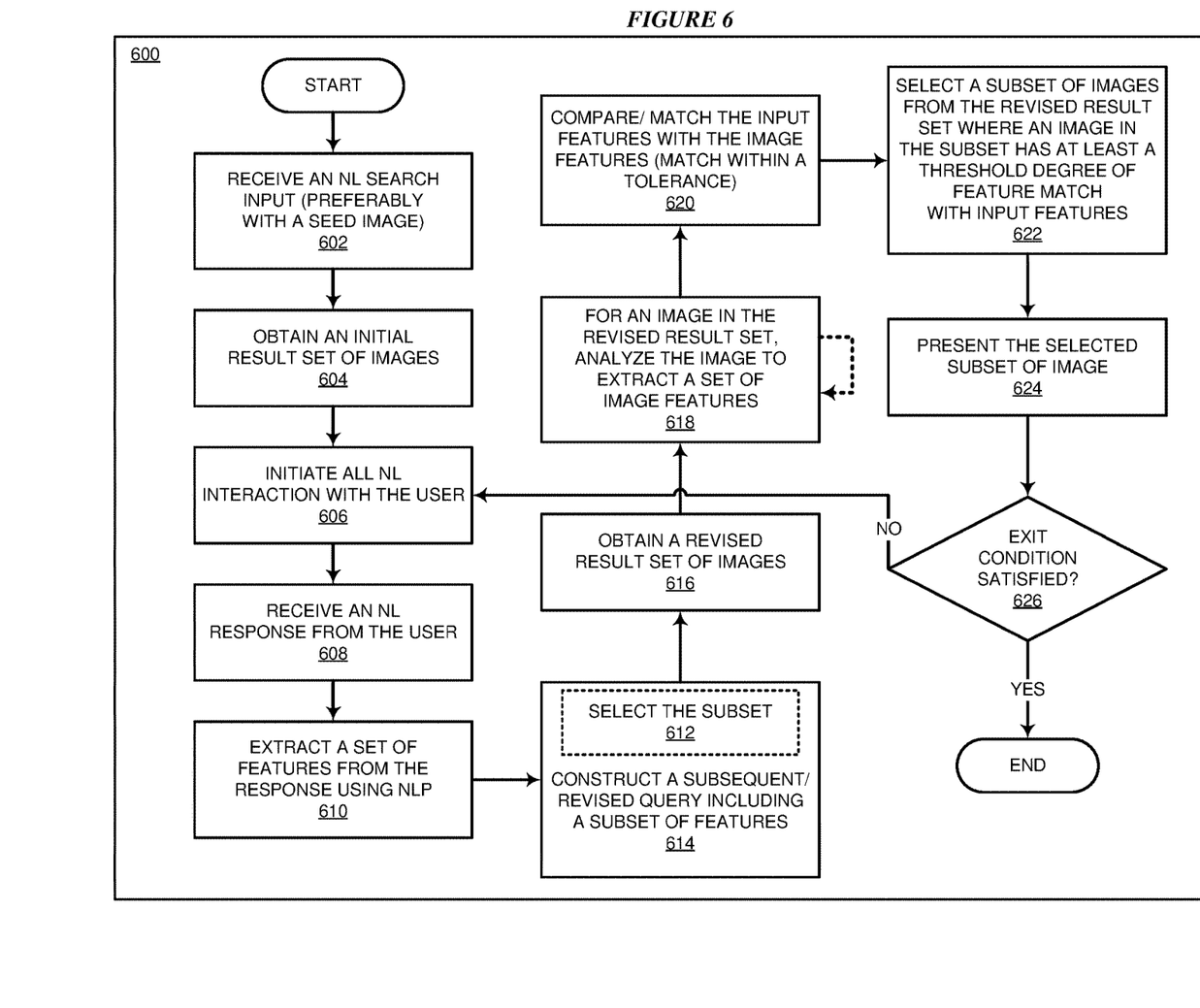
FIG. 6 depicts a flowchart of an example process for image retrieval using interactive natural language dialog in accordance with an illustrative embodiment.

With reference to FIG. 6, this figure depicts a flowchart of an example process for image retrieval using interactive natural language dialog in accordance with an illustrative embodiment. Process 600 can be implemented in application 302 in FIG. 3.

The application receives an NL search input from a user (block 602). The application preferably also receives a seed image from the user at block 602. The application extracts a set of NL response features and/or a set of image features, as the case may be, from the input of block 602. The application uses the set of features to extract a result set comprising image results (block 604).

The application initiates an NL interaction with the user (block 606). The application receives one or more NL responses from the user (block 608). The application adds the NL response(s) to a cumulative NL basis and extracts a revised set of features from the cumulative NL basis using NLP (block 610).

The application may select a subset of the revised set of features (block 612) and constructs a revised search query from the selected subset or the revised set of features (block 614). The application sends the revised query to a search engine. In response to the revised query, the application obtains a revised result set of images (block 616). For an image result in the result set, the application analyzes the image result to extract a set of image features (block 618). The application repeats block 618 for as many image results as may be useful in a given implementation.

The application compares or matches (within a tolerance) the image features computed at block 618 with the set of input features (block 620). The set of input features comprises a set of response features—which may be computed from a single user input or a cumulative NL basis from the user, and a set of image features of a seed image when a seed image is provided.

Depending on the computed match results of block 620, the application selects a subset of image results from the revised result set where an image in the subset has at least a threshold degree of feature match with the input features (block 622). The application presents the selected subset of image results, with optional rearrangement according to the confidence values of the image results (block 624).

The application determines whether an exit condition has been satisfied (block (626). If an exit condition has not been satisfied ("No" path of block 626), the application returns to block 606. If an exit condition has been satisfied ("Yes" path of block 626), the application ends process 600 thereafter.

Thus, a computer implemented method, system or apparatus, and computer program product are provided in the illustrative embodiments for image retrieval using interactive natural language dialog and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, including but not limited to computer-readable storage devices as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
modifying a search engine to perform increasingly precise image searching using iterative Natural Language (NL) interactions of a trained combination of an application and a cognitive system, the modifying comprising:
extracting, from an NL search input originating from the application, a set of input features, the set of input features comprising a set of response features extracted using the cognitive system, the set of response features corresponding to an NL statement in the NL search input and a set of image features from a seed image in the NL search input;
performing image analysis on an image result in a result set, the result set being responsive to a query comprising a subset of the input features;
providing at least a subset of the result set as a part of an NL interaction in a next iteration of NL interactions;
adding, to the NL search input, an NL response obtained in the next iteration to form a cumulative NL basis for the image searching;
analyzing the cumulative NL basis to extract a new set of response features;
constructing a new search query using at least a subset of the new set of response features from the cumulative NL basis; and
providing a revised result set responsive to the new search query, wherein the revised result set includes a new image result, and wherein the new image result corresponds to at least one new response feature of the new set of response features extracted from the cumulative NL basis,
wherein the trained combination of the application and the cognitive system is trained by providing an initial training input, as another NL statement, and a training seed image to the application and the cognitive system, the application and the cognitive system being separate, wherein sets of training input features and training image features are extracted by the application and the cognitive system and a training confidence value of a corresponding training image result is evaluated relative to features of the training seed image.

2. The method of claim 1, the modifying further comprising:
constructing the query for the search engine, the query specifying the subset of the input features to the search engine; and
obtaining the result set from the search engine.

3. The method of claim 1,
wherein the analyzing of the cumulative NL basis uses Natural Language Processing (NLP) on the NL response received in the next iteration of NL interactions; and
wherein the modifying further comprises obtaining the revised result set from the search engine.

4. The method of claim 1, the modifying further comprising:
comparing, within a tolerance value, a set of image features of the image result with the subset of the input features, wherein the set of image features of the image result is obtained from the performing the image analysis; and
computing a confidence value according to a degree of match computed by the comparing.

5. The method of claim 4, the modifying further comprising:
selecting the subset of the result set, wherein the subset of the result set includes those image results whose confidence value exceeds a threshold confidence value;
reordering image results in the subset of the result set according to the confidence values of the image results in the subset of the result set; and
presenting, as a part of the providing, the reordered subset of the result set.

6. The method of claim 1, wherein the NL search input comprises an NL statement and a seed image.

7. The method of claim 1, wherein the NL search input comprises only an annotated seed image.

8. The method of claim 1, wherein the next iteration is a member of a set of iterations, wherein each iteration in the set of iterations progressively causes an increase in a relevance of image results of a corresponding revised result set, and wherein the increase in the relevance is achieved in human-like NL interactions with a human user.

9. A computer usable program product comprising a computer-readable storage device, and program instructions stored on the storage device, the stored program instructions comprising:
program instructions to modify a search engine to perform increasingly precise image searching using iterative Natural Language (NL) interactions of a trained combination of an application and a cognitive system, the program instructions to modify comprising:
program instructions to extract, from an NL search input originating from the application, a set of input features, the set of input features comprising a set of response features extracted using the cognitive system, the set of response features corresponding to an NL statement in the NL search input and a set of image features from a seed image in the NL search input;
program instructions to perform image analysis on an image result in a result set, the result set being responsive to a query comprising a subset of the input features;
program instructions to provide at least a subset of the result set as a part of an NL interaction in a next iteration of NL interactions;

program instructions to add, to the NL search input, an NL response obtained in the next iteration to form a cumulative NL basis for the image searching;
program instructions to analyze the cumulative NL basis to extract a new set of response features;
program instructions to construct a new search query using at least a subset of the new set of response features from the cumulative NL basis; and
program instructions to provide a revised result set responsive to the new search query, wherein the revised result set includes a new image result, and wherein the new image result corresponds to at least one new response feature of the new set of response features extracted from the cumulative NL basis,
wherein the trained combination of the application and the cognitive system is trained by providing an initial training input, as another NL statement, and a training seed image to the application and the cognitive system, the application and the cognitive system being separate, wherein sets of training input features and training image features are extracted by the application and the cognitive system and a training confidence value of a corresponding training image result is evaluated relative to features of the training seed image.

10. The computer usable program product of claim 9, the program instructions to modify further comprising:
program instructions to construct the query for the search engine, the query specifying the subset of the input features to the search engine; and
program instructions to obtain the result set from the search engine.

11. The computer usable program product of claim 9,
wherein the program instructions to analyze the cumulative NL basis include program instructions to use Natural Language Processing (NLP) on the NL response received in the next iteration of NL interactions; and
wherein the program instructions to modify further comprises program instructions to obtain the revised result set from the search engine.

12. The computer usable program product of claim 9, the program instructions to modify further comprising:
program instructions to compare, within a tolerance value, a set of image features of the image result with the subset of the input features, wherein the set of image features of the image result is obtained from the performing the image analysis; and
program instructions to compute a confidence value according to a degree of match computed by the comparing.

13. The computer usable program product of claim 12, the program instructions to modify further comprising:
program instructions to select the subset of the result set, wherein the subset of the result set includes those image results whose confidence value exceeds a threshold confidence value;
program instructions to reorder image results in the subset of the result set according to the confidence values of the image results in the subset of the result set; and
program instructions to present, as a part of the providing, the reordered subset of the result set.

14. The computer usable program product of claim 9, wherein the NL search input comprises an NL statement and a seed image.

15. The computer usable program product of claim 9, wherein the NL search input comprises only an annotated seed image.

16. The computer usable program product of claim 9, wherein the next iteration is a member of a set of iterations, wherein each iteration in the set of iterations progressively causes an increase in a relevance of image results of a corresponding revised result set, and wherein the increase in the relevance is achieved in human-like NL interactions with a human user.

17. The computer usable program product of claim 9, wherein the program instructions are stored in a computer readable storage device in a data processing system, and wherein the program instructions are transferred over a network from a remote data processing system.

18. The computer usable program product of claim 9, wherein the program instructions are stored in a computer readable storage device in a server data processing system, and wherein the program instructions are downloaded over a network to a remote data processing system for use in a computer readable storage device associated with the remote data processing system.

19. A computer system comprising a processor, a computer-readable memory, and a computer-readable storage device, and program instructions stored on the storage device for execution by the processor via the memory, the stored program instructions comprising:
program instructions to modify a search engine to perform increasingly precise image searching using iterative Natural Language (NL) interactions of a trained combination of an application and a cognitive system, the program instructions to modify comprising:
program instructions to extract, from an NL search input originating from the application, a set of input features, the set of input features comprising a set of response features extracted using the cognitive system, the set of response features corresponding to an NL statement in the NL search input and a set of image features from a seed image in the NL search input;
program instructions to perform image analysis on an image result in a result set, the result set being responsive to a query comprising a subset of the input features;
program instructions to provide at least a subset of the result set as a part of an NL interaction in a next iteration of NL interactions;
program instructions to add, to the NL search input, an NL response obtained in the next iteration to form a cumulative NL basis for the image searching;
program instructions to analyze the cumulative NL basis to extract a new set of response features;
program instructions to construct a new search query using at least a subset of the new set of response features from the cumulative NL basis; and
program instructions to provide a revised result set responsive to the new search query, wherein the revised result set includes a new image result, and wherein the new image result corresponds to at least one new response feature of the new set of response features extracted from the cumulative NL basis,
wherein the trained combination of the application and the cognitive system is trained by providing an initial training input, as another NL statement, and a training seed image to the application and the cognitive system, the application and the cognitive system being separate, wherein sets of training input features and training image features are extracted by the application and the cognitive system and a training confidence value of a corresponding training image result is evaluated relative to features of the training seed image.

20. The computer system of claim 19, the program instructions to modify further comprising:

program instructions to construct the query for the search engine, the query specifying the subset of the input features to the search engine; and program instructions to obtain the result set from the search engine.

* * * * *